Patented Sept. 30, 1952

2,612,490

UNITED STATES PATENT OFFICE 2,612,490

HOMOGENEOUS POLYMERIZATION OF VINYLIDENE COMPOUNDS WITH AN $\alpha,\alpha$-DIALKYLARYLMETHYL HYDROPEROXIDE AND A HEAVY METAL COMPOUND AS CATALYST Charles W. Gould, Wilmington, Del., assignor to Hercules Powder Company, Wilmington, Del., a corporation of Delaware No Drawing. Application December 24, 1948, Serial No. 67,243

9 Claims. (Cl. 260—63)

This invention relates to an improved process for the homogeneous polymerization of unsaturated compounds and more particularly to an improved process of homogeneously polymerizing vinyl, vinylidene, and vinylene compounds.

It is well known that the homogeneous polymerization of vinyl-type compounds may be accelerated by means of heat, actinic light, or a catalyst such as the organic peroxides. Of these accelerators, the peroxidic catalysts have been the most widely employed but difficulty is frequently encountered in obtaining a high yield of the polymer in a reasonable length of time. In addition many of the peroxide catalysts tend to discolor the polymer and to produce polymers with lower average molecular weights.

Now in accordance with this invention it has been found that the homogeneous polymerization of monomeric compounds containing the $CH_2=C<$ group and which are capable of being polymerized by a peroxide catalyst may be carried out to advantage in the presence of an $\alpha,\alpha$-dialkylarylmethyl hydroperoxide and a heavy metal acetylacetonate. The incorporation of the acetylacetonate not only makes possible a more complete polymerization but also permits the use of lower temperatures for the reaction. In addition, air does not have to be excluded from the polymerization reaction since the presence of oxygen actually improves the polymerization when initiated by the combination of the $\alpha,\alpha$-dialkylarylmethyl hydroperoxide and heavy metal acetylacetonate.

The following examples are illustrative of the process of homogeneous polymerization in accordance with this invention. All parts and percentages given in the examples represent parts and percentages by weight.

Example 1

Two glass polymerization vessels were charged with a solution of 0.9 part of ferric acetylacetonate and 2.7 parts of a 46% solution of $\alpha,\alpha$-dimethylbenzyl hydroperoxide in cumene, in 200 parts of freshly distilled methyl isopropenyl ketone. All of the air was evacuated from one of the vessels before closing and the other vessel was closed without removing the air. The polymerization reaction was carried out by heating each vessel to 50° C. for a period of one week In each case the polymer obtained was soluble in methyl ethyl ketone and insoluble in methanol. In the absence of air a 49% yield of a soft polymer was obtained whereas in the presence of air there was obtained a 100% yield of a polymer which had a hardness of 30 and cold flow of 6 as determined by a Barcol Impressor.

Example 2

Duplicating the procedure of Example 1, methyl methacrylate was polymerized in the presence of $\alpha,\alpha$-dimethylbenzyl hydroperoxide and ferric acetylacetonate in the presence of air and in the absence of air. The polymers were soluble in methyl ethyl ketone and insoluble in methanol. The yield and the hardness and cold flow as determined by a Barcol Impressor are tabulated below.

| Polymerization in— | Percent Yield Polymer | Hardness | Cold Flow |
|---|---|---|---|
| Absence of air | 91 | 25 | 10 |
| Presence of air | 94 | 35 | 5 |

Example 3

The procedure of Example 1 was repeated using styrene as the monomeric material. A 95% yield was obtained both with and without air, but the polymer formed in the presence of air was more completely cured, having a hardness of 15 and cold flow of 3 as compared with a hardness of 5 and cold flow of 7 for the polymer prepared in the absence of air.

Example 4

Two glass polymerization vessels were charged with 100 parts of powdered hydroabietyl fumarate, 2.0 parts of $\alpha,\alpha$-dimethylbenzyl hydroperoxide, 0.2 part of ferric acetylacetonate, and 25 parts of isobutylene. A slight excess of isobutylene was added to one the vessels and then permitted to boil off in order to sweep all air out of the free space before sealing. The other vessel was closed without removing the air from the free space. Both vessels and their contents were then heated to 65° C. and the extent of polymerization was determined by removing an aliquot from the vessel at the end of 7 and 24 hours. The results are set forth below, the per cent conversion indicated being the per cent of hydroabietyl fumarate converted to the copolymer.

| Polymerization in— | Percent Conversion | |
|---|---|---|
| | 7 hrs. | 24 hrs. |
| Absence of air | 18.5 | 35.4 |
| Presence of air | 23.1 | 46.1 |

The polymerization process in accordance with this invention is carried out by the bulk or solution method of homogeneous polymerization using the combination of an $\alpha,\alpha$-dialkylarylmethyl hydroperoxide and a heavy metal acetylacetonate to initiate the polymerization. As may be seen from the foregoing examples, carrying out the polymerizations in the presence of this combination of initiators results in the production of polymers having excellent properties, which are even further improved by the presence of oxygen during the polymerization reaction.

The $\alpha,\alpha$-dialkylarylmethyl hydroperoxides used as the catalysts in the process of this invention have the following structural formula

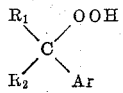

where $R_1$ and $R_2$ represent alkyl groups and Ar represents a substituent selected from the group consisting of aryl and alkaryl groups. Exemplary of such hydroperoxides are $\alpha,\alpha$-dimethylbenzyl, $\alpha,\alpha$-dimethyl-p-isopropylbenzyl, $\alpha,\alpha$-dimethyl-p-methylbenzyl, and $\alpha,\alpha$-ethylmethylbenzyl hydroperoxides. These compounds may also be named as aryl(dialkyl)methyl hydroperoxides.

The $\alpha,\alpha$-dialkylarylmethyl hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the aqueous alkali may be between about 1 and about 35% although it is preferable to use concentrations of about 2 to about 8%. Vigorous agitation is desirable during the oxidation reaction.

As illustrative of the alkyl-substituted aromatic organic compounds which may be oxidized, p-cymene, cumene, diisopropyl benzene, and sec-butylbenzene may be mentioned. These compounds lead to $\alpha,\alpha$-dimethyl-p-methylbenzyl, $\alpha,\alpha$-dimethylbenzyl, $\alpha,\alpha$-dimethyl-p-isopropylbenzyl, and $\alpha,\alpha$-ethylmethylbenzyl hydroperoxides, respectively. The aryl and alkaryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl and the like, the same alkyl groups also being representative of $R_1$ and $R_2$ in the structural formula. $R_1$ and $R_2$ may be either the same or different.

The amount of hydroperoxide which may be used in accordance with this invention may be from about 0.001% to about 5.0% based on the monomers, and preferably is from about 0.1% to about 3%.

The addition of a heavy metal acetylacetonate to the polymerization system in which an $\alpha,\alpha$-dialkylarylmethyl hydroperoxide is used as catalyst is advantageous in that more complete polymerization is obtained and consequently a harder polymer is formed. Among the heavy metal acetylacetonates which may be used are the acetylacetonates of iron (either ferrous or ferric), cobalt, nickel, copper, silver, zinc, cadmium, mercury, chromium, manganese, or molybdenum. The heavy metal acetylacetonate should be used in an amount such as will provide from about 0.001% to about 0.35% and preferably about 0.01% to about 0.2% of the heavy metal based on the weight of monomers used and accordingly the amount of metal acetylacetonate will vary from about 0.01% to about 2.5% and preferably about 0.05% to about 1.0%.

As may be seen from the foregoing examples, it is not necessary to exclude air from the polymerization system when the polymerization is carried out by the process in accordance with this invention. In fact, the presence of oxygen actually improves the accelerating effect of the metal compound, an excellent cure being obtained under the same conditions which yielded an undercured polymer in the absence of the oxygen. This is most unusual since the presence of air usually has a deleterious effect on polymerizations. Thus, the use of the combination of $\alpha,\alpha$-dialkylarylmethyl hydroperoxide and metal acetylacetonate obviates the necessity for rigorously excluding air and thus it is possible to carry out the polymerization reaction by heating or refluxing the reactants in an open reaction vessel if desired. It also makes it possible to carry out the polymerization while exposed to air as is necessary in such applications as in coatings, or in continuous casting or laminating of thin sheets. The oxygen may be present as free oxygen, or as an oxygen-containing gas such as air or mixtures of oxygen with an inert gas such as nitrogen.

The homogeneous polymerization in accordance with this invention may be carried out by either bulk or solution polymerization under the conditions well known in the art for homogeneous polymerization. The temperature of the polymerization reaction may vary from about 25° to about 100° C. and preferably is from about 50° to about 80° C. The examples have illustrated the process of carrying out the homogeneous polymerization in accordance with this invention by means of bulk polymerization. The process is equally applicable, however, to solution polymerization; i. e., polymerization in a solvent such as benzene, toluene, xylene, hexane, acetone, and the like.

Compounds which may be advantageously polymerized in accordance with this invention include any vinyl or vinylidene compounds; i. e., compounds containing the $CH_2=C<$ group, which are capable of being polymerized by a peroxide catalyst. Monomers which may be so polymerized are the conjugated butadienes such as butadiene, isoprene, dimethyl butadiene, chloroprene, etc., and other compounds containing the vinyl group such as styrene, acrylonitrile, acrylic acid esters such as methyl acrylate, etc., methacrylic acid esters such as methyl methacrylate, methyl vinyl ketone, methyl isopropenyl ketone, vinyl pyridine, various vinyl ethers and esters, and other monomers which form addition polymers, as well as monomer mixtures of two or more of these monomers. In addition to the monomers containing the $CH_2=C<$ group which are capable of being polymerized by a peroxide catalyst are those monomers containing such a group which in combination with another unsaturated monomer provide a combination which is capable of polymerization with a peroxide catalyst as, for example, the isobutylene-hydroabietyl fumarate combination shown in Example 4.

The polymerization processes of this invention are advantageous in that they allow the use of polymerization temperatures which are far below the thermal decomposition temperatures of the hydroperoxide and at the same time yield a completely cured polymer. A faster polymerization rate at a given temperature is obtained and it is possible to carry out bulk polymerization without rigorously excluding air and thus can be used advantageously in such applications as casting vinyl resins and in contact pressure laminating with polyester-type resins.

What I claim and desire to protect by Letters Patent is:

1. The process which comprises homogeneously polymerizing a monomeric compound containing the $CH_2=C<$ group and which is capable of being polymerized by a peroxide catalyst, in the presence of a catalyst comprising an $\alpha,\alpha$-dialkylarylmethyl hydroperoxide in which each alkyl group contains not more than 4 carbon atoms and a heavy metal acetylacetonate.

2. The process which comprises homogeneously polymerizing a monomeric compound containing the $CH_2=C<$ group and which is capable of being polymerized by a peroxide catalyst, in the presence of a catalyst comprising an $\alpha,\alpha$-dialkylarylmethyl hydroperoxide in which each alkyl group contains not more than 4 carbon atoms, a heavy metal acetylacetonate, and oxygen.

3. The process which comprises homogeneously polymerizing a monomeric compound containing the $CH_2=C<$ group and which is capable of being polymerized by a peroxide catalyst in the presence of a catalyst comprising $\alpha,\alpha$-dimethylbenzyl hydroperoxide and iron acetylacetonate.

4. The process which comprises homogeneously polymerizing a monomeric compound containing the $CH_2=C<$ group and which is capable of being polymerized by a peroxide catalyst in the presence of a catalyst comprising $\alpha,\alpha$-dimethylbenzyl hydroperoxide, iron acetylacetonate, and oxygen.

5. The process which comprises homogeneously polymerizing styrene in the presence of a catalyst comprising $\alpha,\alpha$-dimethylbenzyl hydroperoxide, ferric acetylacetonate, and oxygen.

6. The process which comprises homogeneously polymerizing methyl methacrylate in the presence of a catalyst comprising $\alpha,\alpha$-dimethylbenzyl hydroperoxide, ferric acetylacetonate, and oxygen.

7. The process which comprises homogeneously polymerizing methyl isopropenyl ketone in the presence of a catalyst comprising $\alpha,\alpha$-dimethylbenzyl hydroperoxide, ferric acetylacetonate, and oxygen.

8. The process which comprises homogeneously copolymerizing a monomeric compound containing the $CH_2=C<$ group with an ethylenic unsaturated monomeric compound copolymerizable with the vinylidene compound in the presence of a peroxide catalyst, in the presence of a catalyst comprising an $\alpha,\alpha$-dialkylarylmethyl hydroperoxide in which each alkyl group contains not more than 4 carbon atoms and a heavy metal acetylacetonate.

9. The process which comprises homogeneously copolymerizing a monomeric compound containing the $CH_2=C<$ group with an ethylenic unsaturated monomeric compound copolymerizable with the vinylidene compound in the presence of a peroxide catalyst, in the presence of a catalyst comprising an $\alpha,\alpha$-dialkylarylmethyl hydroperoxide in which each alkyl group contains not more than 4 carbon atoms, a heavy metal acetylacetonate, and oxygen.

CHARLES W. GOULD.

REFERENCES CITED

The following references are of record in the file of this patent:

UNITED STATES PATENTS

| Number | Name | Date |
|---|---|---|
| 2,380,474 | Stewart | July 31, 1945 |
| 2,395,523 | Vaughan et al. | Feb. 26, 1946 |

FOREIGN PATENTS

| Number | Country | Date |
|---|---|---|
| 582,899 | Great Britain | Dec. 2, 1946 |
| 610,293 | Great Britain | Oct. 13, 1948 |